UNITED STATES PATENT OFFICE.

WILMON NEWELL, OF COLLEGE STATION, TEXAS.

INSECTICIDE.

1,026,361.  Specification of Letters Patent.  Patented May 14, 1912.

No Drawing.  Application filed November 20, 1909.  Serial No. 529,131.

*To all whom it may concern:*

Be it known that I, WILMON NEWELL, a citizen of the United States of America, now residing at College Station, in the county of Brazos, in the State of Texas, have invented certain new and useful Improvements in Insecticides for the Mexican Cotton-Boll Weevil, whereof the following is a specification.

The principal object of this invention is to provide an insecticide which is effective and profitable for the destruction of the Mexican cotton boll weevil, which is practically economical in its method of application to the cotton plants, and which will not injure the cotton plant to which it is applied.

The Mexican cotton boll weevil is a true weevil, or snout-beetle, as distinguished from a true biting or masticating insect, and does its feeding within the folded, appressed leaves constituting the terminal whorl or bud at the growing tips of the cotton stems and limbs and within the involucre, or shuck, surrounding the fruiting bud or square. The boll weevil, therefore, cannot be effectively destroyed by the use of the usual arsenical poisons, such as Paris green, London purple, etc., because applications of these poisons in moderate quantities do not result in the weevils securing enough arsenic, in the course of feeding upon the cotton plant, to produce death.

The application of arsenical poisons heretofore commonly known, such as Paris green, London purple, white arsenic, arsenite of lime, lead arsenite, copper arsenite, and others, to the cotton plant in sufficient quantities to kill an appreciable number of the boll weevils is followed by the death of, or severe injury to, the cotton plant itself because all of these poisons contain water-soluble arsenic in quantities sufficient to exert a toxic effect upon the plant. Whenever arsenic in a soluble form, comes in contact with plant tissue, it is carried into the tissue itself by the water in which it is dissolved and a toxic or poisoning effect on the plant is the inevitable result. Liquid sprays of arsenical poisons, such for example, as a liquid spray of the paste form of lead arsenate, cannot be successfully used against the boll weevil for the reason that the particles of poison cannot be applied in the form of a liquid spray to effectively reach the aforesaid feeding places of the boll weevil. The effect of a liquid spray upon the buds of the cotton plants is to drive the leaves composing them closer together and the presence of the moisture causes the leaves composing these buds to adhere to each other tenaciously, thus excluding the spray no matter how much of it is applied or with what force it is applied. Liquid sprays of arsenical poisons are impracticable for the destruction of the boll weevil for the further reason that the cost of handling the enormous quantity of water required in spraying a cotton field is prohibitive of their use.

This invention relates to an arsenical insecticide which overcomes the obstacles referred to and it consists essentially of a practically insoluble insecticide comprising lead arsenate existing in the physical state of an impalpable powder as hereinafter described. Such insecticide contains practically little or no water-soluble arsenic and thus avoids the destructive or injurious effect upon the plants incident to an appreciable presence of the latter ingredient, and its subjectiveness to application by means of a bud-opening air blast enables the insecticide to penetrate the terminal buds and the involucres of the squares in quantities sufficient to destroy the boll weevils feeding there. A strong current of air forces apart the small leaves composing the buds and the minute particles of powdered lead arsenate carried by the same air enter between the leaves and by impact are made to adhere thereto. The principal requisite of this particular physical form of lead arsenate is that it be reduced to an impalpable powder, or to a powder the individual particles of which do not exceed one one-thousandth of an inch in diameter. Any method of comminution which will result in the lead arsenate being reduced to such an impalpable powder will give to it the new and valuable characteristics herein described. Reduction of the lead arsenate to such an impalpable powder may be accomplished by mechanical means, or by a combination of both chemical and mechanical processes. Thus, the following process accomplishes the desired end: Lead arsenate, made by the usual and well-known method of precipitating it from solutions of sodium arsenate and lead acetate, is dried as much as possible by slow heating. Thereafter the desiccation is completed by spreading the lead arsenate in thin layers within an air-tight chamber, in which is also contained a sufficient quantity of dehydrated calcium chlorid to absorb the remaining moisture. When entirely dried by this process the arsenate of lead is reduced to the requisite degree of comminution by grinding with pestle and mortar, or by grinding it between opposed steel, or other metal disks arranged after the manner of old fashioned mill-stones. Thereafter, to remove any particles not rendered sufficiently small by the grinding, the material is sifted through cloth of sufficiently fine mesh and is then ready for use.

My method of applying this new insecticide to cotton, in order to destroy the boll weevil, is as follows: The application is made by means of a hand bellows, to which is attached a receptacle for holding the powdered lead arsenate, the two so arranged that the current of air, when expelled from the bellows, carries the poison with it and forces it into the terminal buds, or whorls of leaves, which are at the ends of the limbs of the cotton plant. The current of air must have sufficient power to force apart the small leaves composing these buds and to deposit the minute particles of poison between them so that they will be eaten by the boll weevil when feeding in these terminal buds, or whorls of leaves. In like manner the poison is forced into the inside of the involucre, or shuck, surrounding the square, and there embedded in, or caused to adhere to, the epidermis of the square itself, where it will be eaten by the boll weevil when it commences to puncture the square with its mouth parts, or beak.

In lieu of the application by a hand bellows as above-described, the application of the powdered lead arsenate may be made with any suitable apparatus or machinery which will mechanically mix the poison with air and, using the air as a carrier, force the poison into the buds and squares of the cotton plant in the manner described.

Applications of the powdered lead arsenate at the rate of from two and one-half to ten pounds per acre are most effective in destroying the boll weevils. The amount applied depends upon the size of the cotton plants; and the applications may be repeated as many times as desired without injury to the plants.

The powdered arsenate of lead, or lead arsenate, hereinbefore referred to, is defined as a finely powdered or pulverized dry dust, consisting of any one or more of the following compounds or mixtures: 1. Arsenate of lead known chemically by the formula $Pb_3(AsO_4)_2$ and designated as lead ortho arsenate, or commercially as "lead arsenate". 2. Arsenate of lead known chemically by the formula $PbHAsO_4$, designated as lead hydrogen arsenate. 3. Arsenate of lead known chemically by the formula $Pb_2As_2O_7$, designated as lead pyro arsenate. 4. Arsenate of lead known chemically by the formula $Pb(AsO_3)_2$, designated as lead meta arsenate. 5. Any lead salt corresponding chemically to the acids $H_3AsO_4$ (ortho arsenic acid), $H_4As_2O_7$ (pyro arsenic acid) or $HAsO_3$ (meta arsenic acid). 6. Any physical or chemical combination of arsenious oxid (or oxids) with oxid (or oxids) of lead, or of arsenic oxid (or oxids) with oxid (or oxids) of lead, in or without association with other ingredients, which shall be practically equivalent to, on chemical analysis, any one or more of the arsenates of lead hereinbefore named, or which shall produce the same physiological effects upon plant and animal life as the arsenates of lead hereinbefore named.

The powdered or pulverized lead arsenate described should not contain more than one-fifth of one per cent. of water-soluble arsenious oxid. Preferably, it should not contain exceeding one-tenth of one per cent. of water-soluble arsenious oxid. The presence of a small amount of lead acetate, remaining from the original solutions of lead acetate and sodium arsenate, used in precipitation of the lead arsenate, does not appear to affect the usefulness of the completed, pulverized lead arsenate.

It is neither necessary nor desirable that the lead arsenate should be precipitated from solution in such a manner as to associate it with either active or inert particles of foreign substances; nor is it necessary or desirable that said powdered or pulverized lead arsenate should be used with a diluent. It requires no dilution and any dilution thereof, or mixture thereof, with either active or inert foreign substances, would reduce its effectiveness.

Having thus described my invention, what I claim as new and desire to secure by Letters Patent, is—

1. An insecticide containing arsenate of lead existing in the physical state of an impalpable powder.

2. A chemical compound consisting of lead arsenate in the form of an impalpable powder.

3. An insecticide containing arsenate of lead existing in the physical state of an impalpable powder, composed of particles not exceeding one one-thousandth of an inch in diameter.

4. An insecticide consisting essentially of arsenate of lead in the physical state of an impalpable powder composed of particles not exceeding one one-thousandth of an inch in diameter.

5. A chemical compound consisting of lead arsenate in the form of an impalpable powder composed of particles not exceeding one one-thousandth of an inch in diameter.

WILMON NEWELL.

Witnesses:
 THOS. J. KERNAN,
 C. STEWART COMEAUX.

Copies of this patent may be obtained for five cents each, by addressing the "Commissioner of Patents, Washington, D. C."